United States Patent [19]
Yung

[11] Patent Number: 5,147,421
[45] Date of Patent: Sep. 15, 1992

[54] WET SCRUBBER PARTICLE DISCHARGE SYSTEM AND METHOD OF USING THE SAME

[75] Inventor: Shui-Chow Yung, Encinitas, Calif.

[73] Assignee: Calvert Environmental, Inc., San Diego, Calif.

[21] Appl. No.: 728,973

[22] Filed: Jul. 12, 1991

[51] Int. Cl.⁵ .............................................. B01D 47/06
[52] U.S. Cl. .......................................... 55/85; 55/89; 55/228; 55/242; 110/215
[58] Field of Search ...................... 55/84, 85, 94, 228, 55/242, 257.1, 72, 89, 227; 110/203, 215, 216

[56] References Cited

U.S. PATENT DOCUMENTS

| | | | |
|---|---|---|---|
| 4,013,455 | 3/1977 | Kleeberg et al. | 55/228 X |
| 4,019,444 | 4/1977 | Kleeberg et al. | 55/228 X |
| 4,305,909 | 12/1981 | Willett et al. | 55/228 X |
| 4,541,846 | 9/1985 | Sjodin | 55/97 |
| 4,765,805 | 8/1988 | Wahl et al. | 55/72 X |
| 4,854,946 | 8/1989 | Heijwegen et al. | 55/85 |

*Primary Examiner*—Charles Hart
*Attorney, Agent, or Firm*—Bernard L. Kleinke; Jerry R. Potts; William Patrick Waters

[57] ABSTRACT

A particle discharge system employs a wet scrubber producing a waste particle sludge, and an evaporator and solidifier operating in parallel with the wet scrubber to cause discharge material to be dried and then solidifed in a compacted composition for convenient disposal.

19 Claims, 1 Drawing Sheet

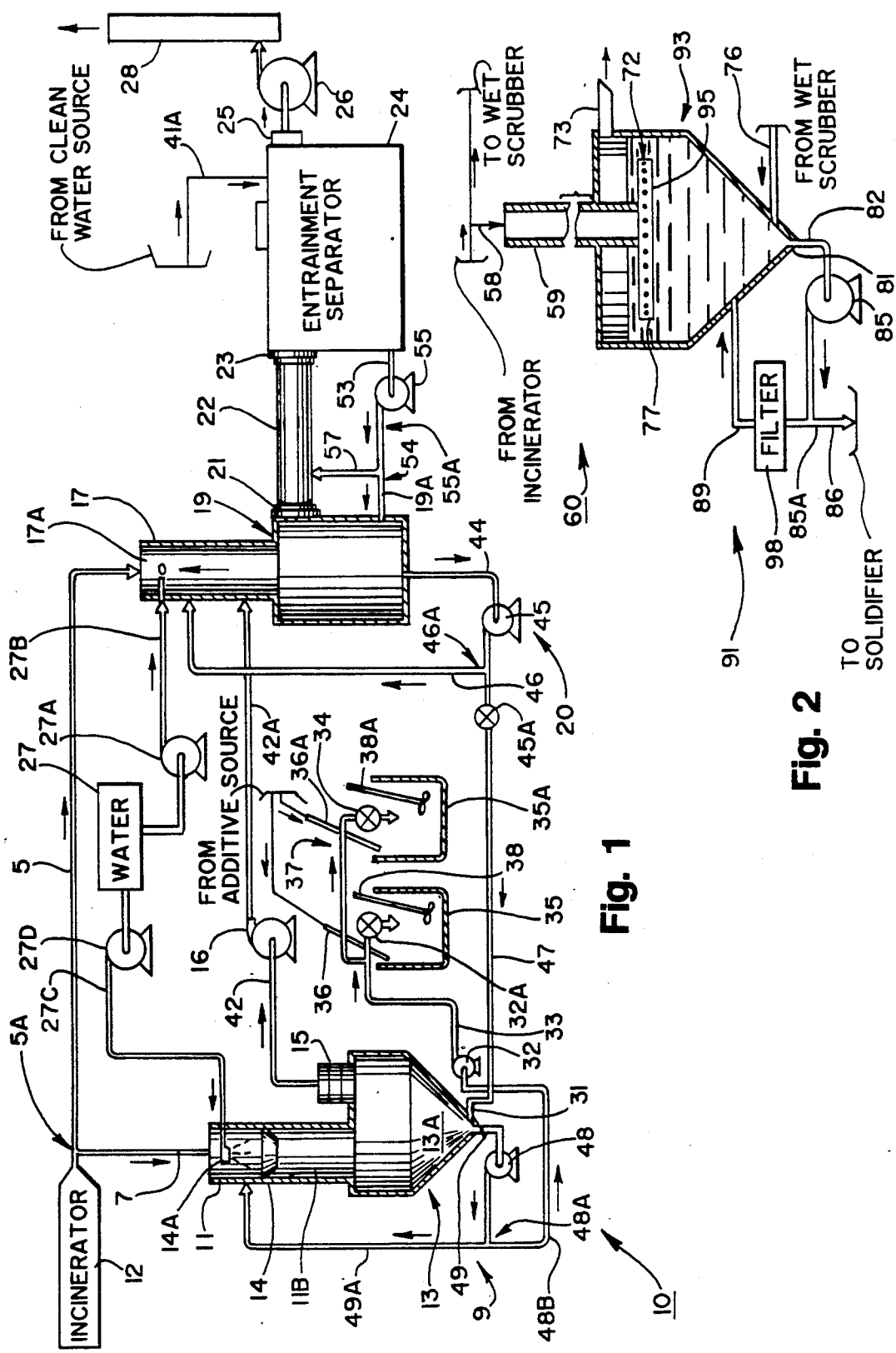

WET SCRUBBER PARTICLE DISCHARGE SYSTEM AND METHOD OF USING THE SAME

TECHNICAL FIELD

The present invention relates generally to wet scrubber systems, and more particularly to a wet scrubber particle discharge system and a method of using the same to facilitate particle removal therefrom.

BACKGROUND ART

Wet scrubbers have been proven to be very effective in cleaning waste gas streams from a variety of sources, including toxic waste incinerators. Such incinerators are used in many applications as, for example, in hospitals where the incinerators are utilized for convenient disposal of a large variety of substances. After incineration, many potentially hazardous and toxic constituents pass, in an gas stream, from the incinerator into a wet scrubber for cleaning purposes, prior to discharge to the atmosphere. The wet scrubber removes a substantial amount of the unwanted constituents from the gas stream, prior to discharging the clean gas into the atmosphere. The particulate matter is removed from the scrubber in the form of a sludge, and contains many unwanted and potentially toxic constituents, generally entrained in an aqueous medium. While the clean gas may be released into the atmosphere in a convenient manner, safe disposal of the sludge is an important consideration.

Traditionally, sludge disposal has presented a considerable problem. The problem is even more serious when the sludge contains such substances as heavy metals, dioxin and natural and synthetic organic compounds having health threatening characteristics. In the past, before environmental and health concerns were focused on matters such as sludge disposal, the disposal of sludge from wet scrubbers was less of a problem. Of course, improper disposal methods, while convenient, could impose a significant penalty on the environment. Such methods also present a safety problem for those persons responsible for the handling of the toxic sludge. Thus, such sludge disposal has presented an unacceptable public health hazard. Alternative methods of handling unwanted constituents in waste gases have been employed. In this regard, reference may be made to U.S. Pat. Nos. 3,590,918; 4,013,455 and 4,133,654.

In general, conventional systems, such as the one disclosed in U.S. Pat. No. 4,013,455, have attempted to dry the discharged sludge to help facilitate safer removal thereof. In this regard, the sludge is dried to remove water from the sludge, to leave a relatively dry particulate. However, a limitation of such a technique is that, when the sludge drying equipment is utilized in conjunction with an operating scrubber system, the drying equipment can slow down the scrubbing operation. In addition, if a malfunction in the drying equipment occurs, the entire scrubber operation may be interfered with, or even curtailed. The scrubber may require to be shut down until repairs are made. Thus, it would be highly desirable to have a waste particle disposal system which is capable of efficient particle removal, without substantial interference with the associated wet scrubber.

In U.S. Pat. No. 4,013,455, there is disclosed a process in which sludge, from a wet scrubbing process is flash evaporated, utilizing incinerator waste gas, to dry the sludge. Although the weight and volume of the sludge mass is reduced by the evaporation of water therefrom, the resultant mass of particles can still present serious handling and disposal problems, especially where the system is employed in a facility, such as a hospital, where safety and sanitary conditions are of the utmost importance.

As an illustration of the problems presented in disposal of dried sludge, the products generated from a typical hospital incinerator may deserve some attention. In these cases, the dry particle mass can include highly toxic materials such as heavy metals and dioxin. As mentioned, water removal from the sludge has some benefit by reducing the weight and volume of the material requiring disposal. However, substantial problems relating to handling and disposing of the noxious dry particulate mass remain.

In general, hospitals or other such institutions and organizations are found in highly populated urban centers. As a result, dry particulate waste substances should be handled very carefully, by highly trained and well paid personnel, to avoid contamination of residential neighborhoods. In addition, practices must be implemented to prevent particles from becoming airborne, thereby presenting a public health hazard. Of course, the needs of the patients and other people, such as employees of the hospital, must be considered in this regard. Because of their often weakened physical condition, patients should be shielded or otherwise protected from exposure to health threatening airborne particles. Thus, the problem of waste substance handling, especially in the hospital environment, becomes an expensive, undesirable and unwanted task.

Even when safe and efficient waste handling techniques can be utilized, disposal of the dry particulate waste can present a serious problem, from the ecological and economic viewpoint. It is well recognized that landfills and other areas for receiving toxic waste disposal are being depleted at a rapid rate. As a result, it can be necessary, in some situations, to haul toxic substances for long distances, away from populated centers, for disposal purposes. Such transportation expenses can add unwanted expense to the waste disposal process. In addition, the danger of contamination of the environment can become more significant as the amount of expert and skillful handling is required, and the distance of transportation to a disposal site increases.

In view of the foregoing, it would be highly desirable to have an apparatus and method for disposing of noxious, unwanted particulate substances, in a safe and efficient manner. Such an apparatus and method would permit accumulation of unwanted particulates in a safe and convenient manner, by relatively untrained personnel. In addition, it would be especially advantageous if the noxious particulate could be disposed of conveniently without the necessity of transporting the product over excessive distances, to waste disposal sites.

DISCLOSURE OF INVENTION

Therefore, it is the principal object of the present invention to provide a new and improved particle disposal system and method of using it for disposing of unwanted particles in a relatively safe and convenient manner.

It is a further object of the present invention to provide such a new and improved system and method for disposing of waste particles, while reducing the risk to the environment and to those persons responsible for disposing of such substances.

Briefly, the above and further objects of the present invention are realized by providing a new and improved particle discharge system and a method for waste particle disposal in a relatively safe and convenient manner.

A particle discharge system employs a wet scrubber producing a waste particle sludge, and an evaporator and solidifier operating in parallel with the wet scrubber to cause discharge material to be dried and then solidified in a compacted composition for convenient disposal. In formation of the solidified composition, noxious and other unwanted particles are entrapped within a solid block, thereby eliminating the likelihood of interaction of the particles with the environment. In addition, the solidified composition can be handled in a much safer and more convenient manner. The inventive system and method of using it enable the wet scrubber system to operate independently, without substantial interference from the evaporator and solidifier. Thus, should the evaporator or solidifier malfunction, the wet scrubber can continue to operate unimpaired.

BRIEF DESCRIPTION OF DRAWINGS

The above mentioned and other objects and features of the present invention and the manner of attaining them will become apparent, and the invention itself will be best understood by reference to the following description of embodiments of the invention in conjunction with the accompanying drawings, wherein:

FIG. 1 is a diagrammatic representation of the particle discharge system constructed in accordance with the present invention; and FIG. 2 is a diagrammatic representation of another particle discharge system constructed in accordance with the present invention.

BEST MODE FOR CARRYING OUT THE INVENTION

Referring now to the drawings, and more particularly to FIG. 1 thereof, there is shown a particle discharge system 10 which is constructed in accordance with the present invention. The system 10 removes noxious particles from a hot waste gas produced by an incinerator 12. Such gases can contain toxic and unhealthful substances such as heavy metals and dioxin, and at the outlet of the incinerator can have a temperature of 2,000° F. The discharge system generally comprises a wet scrubber generally indicated at 20 for separating the unwanted noxious particles from the waste gas emitted from the incinerator 12. A conduit 47 conveys the waste particles in the form of a sludge, to a dry discharge unit generally indicated at 9. The unit 9 includes an evaporator 13 which drys the sludge to concentrate it, and a solidifier 37 which renders the concentrated sludge into individual hardened blocks (not shown) of waste particulate. Such solid blocks are easily and safely disposed of, since the noxious particles are confined safely within the blocks.

In order to enable the wet scrubber 20 to function independently of the dry discharge unit 9, a conduit or line 5 conveys the bulk of the hot waste gas to the wet scrubber 20, and a tee or flow diverter 5A causes only a slip stream portion of the hot waste gas to be supplied continuously via a conduit 7 to the evaporator 13 for evaporating the sludge being supplied to it from the wet scrubber. In this regard, the dry discharge unit 9 operates in parallel with the wet scrubber 20 to enable the system 10 to operate continuously, even if the dry discharge unit malfunctions.

In operation, after the gas leaves the incinerator 12, and flows through the flow diverter 5A, in such a manner that only a portion such as approximately 85% of the gas is directed via the conduit 5 into an inlet chamber 17 of a quencher 19 of the wet scrubber 20. Fresh water from a fresh water source 27 is pumped via a pump 27A through a line 27B into the chamber 17 where it is sprayed through a conventional wet scrubber nozzle 17A to cool the gas. The particulate matter, combined with water to form a sludge, is pumped via a pump 45 from a bottom outlet of the quencher 19 through a conduit 44. A portion of the sludge is recycled via a tee 46A into a conduit 46 and back into the chamber 17 of the quencher 19, while the remaining portion of the sludge flows through a conduit 47 to the dry discharge unit 9. It should be understood that if the dry discharge unit 9 should malfunction, the scrubber 20 continues to function, and its continuous production of sludge is recycled back into the quencher 19. A valve 45A, normally opened, is then closed to prevent sludge from flowing to the unit 9, until the unit 9 is repaired.

The wetted gas in the quencher 19, having had some of its particulate matter removed, passes through an outlet 21 into a scrubbing conduit 22 having spray nozzles (not shown) therein to perform the bulk of the particle removal. From there, the gas flows into an entrainment separator 24 via an entrainment inlet 23 to remove water drop via baffles (not shown) prior to being discharged to the atmosphere. Clean water is pumped by a pump (not shown) through a line 41A from a water source into the entrainment separator 24. In the entrainment separator, the gas undergoing treatment engages a series of baffles (not shown) so that a substantial amount of the water is removed therefrom. This water is removed from the entrainment separator 24 via a conduit 53, by a pump 55. A tee 54 connects the discharge outlet of the pump 55 via a conduit 19A to enable water to flow into the quencher 19 for removal of the sludge therefrom under the further control of the pump 45. A conduit 57 connected to the tee 54 permits a portion of the sludge to recirculate through the scrubbing conduit 22 for further particle separation.

After the gas has been processed in the entrainment separator 24, it is cooled, relatively dry and particle free. A fan or blower 26 moves the clean gas from an entrainment separator outlet 25 into a stack 28 for discharge into the atmosphere.

Considering now the operation of the dry discharge unit 9 in greater detail, the unit 9 causes the sludge flowing to it via the conduit 47 to be dried and solidified. As indicated above, a slip stream portion such as approximately 15% of the hot incinerator flue gas, is diverted through the conduit into the quencher 13 of the unit 9. After passing from the diverter 5A, the hot flue gas enters a chamber 11 of the evaporator 13. Fresh water from a source 27 is conveyed via a pump 27D through a line 27C into the chamber 11 where it is delivered via a conventional spray nozzle 14A to quench the gas. The temperature of the gas is reduced from about 1800° F.–2200° F. to about 1500° F. during this initial quenching operation. In this regard, this prequenching operation reduces the spray drying effect so that the resulting steam, and not the unwanted particles, cool somewhat prior to the subsequent evaporation step of the operation.

At this stage, steam combines with the waste gas and the two flow through a Venturi cone 14 disposed in the upper portion of the chamber 11, into a lower portion 11B of the chamber 11 to atomize sludge particles at a high velocity and at a lower temperature. The hot wet gas is compressed as it passes through the Venturi cone 14, and upon exiting the chamber 11B, the gas atomizes the sludge into drops. The sludge drops are exposed to the hot gas stream and evaporation of water occurs at the surface of the sludge drops. These wet sludge droplets contain many of the heavy metal and other unwanted constituents which have been removed from the waste gas stream.

The sludge passes into an evaporator sump 13A. A portion of the sludge exits from a bottom outlet of the sump through a conduit 49. The sludge is pumped via a pump 48 through a conduit 49A via a tee 48A back into the chamber 11 between the nozzle 14A and the Venturi 14, for further processing. A conduit 48B connected to the tee 48A conveys the sludge to the solidifier 37 via a pump 32, having a conduit 33 connected to its discharge outlet.

The resulting steam is pumped through a demister 15 downstream of the evaporator 13 by a fan 16 via a line 42 through a conduit 42A and into the chamber 17 of the quencher 19 for further processing and for further particle removal. It should be noted that if all the water in the droplets is evaporated in the evaporator 13, small solid residues will be swept back into the scrubber. Therefore, the pre-quenching operation minimizes this spray-drying effect, for certain applications.

In order to add to the sludge which is being removed from the evaporator through the conduit 49, a substantial amount of wet sludge is continuously being pumped from the scrubber 20 through a lower inlet 31 by the pump 45 through the normally opened valve 45A, and thence the sludge flows into the bottom of the interior of the evaporator 13.

The wet sludge moves from the evaporator 13 to the solidifier 37 thorough a valve 32A into a mixing drum 35 where it is mixed into a homogeneous mass by a paddle or mixer 38. A conventional liquid level sensing device (not shown) controls the valve 32 to close the valve when the wet sludge in the mixer 35 has reached a preselected level. At this point, a valve 34, connected in fluid communication with the conduit 33, is opened and the wet sludge flows into another mixer drum 35A having a paddle or mixer 38A and a similar liquid level controller (not shown).

The homogenized wet sludge in the mixer tanks 35 and 35A is mixed with an additive in the form of a suitable solidifying agent, such as lime, Sorbond ®, a product of American Colloid Company or Portland cement for fixation and solidification of the discharge particulate. The additive is supplied by conduits 36 and 36A to the respective tanks 35 and 35A. The mixing drums 35 and 35A may be lined with conventional plastic trash bag liners (not shown) so that the solidified waste can be conveniently removed therefrom in a safe manner for disposal purposes. The solidified waste produced by the present invention, is safe and convenient to handle. It does not produce airborne particles and, because of the substantial, solid nature of the block produced, the solidified material may be conveniently transported for disposal purposes.

With reference now to FIG. 2, there is shown another particle discharge system 60 which is constructed in accordance with the present invention. It will be understood that the particle discharge system 60 includes a wet scrubber (not shown), such as the wet scrubber 20 (FIG. 1) in a manner similar to that described for the system 10. The system 60 includes a dry discharge unit 91, which is similar to the unit 9 of FIG. 1. In this regard, the unit 91 includes an evaporator 93 and a solidifier (not shown), which is generally similar to the solidifier 37 of FIG. 1. The evaporator 93 is generally similar to the evaporator 13, except that the evaporator 93 contains an alternate structure. In this regard, the evaporator 93 includes a sparger 72.

In operation, hot waste gas from an incinerator (not shown) flows through a conduit 58, in the form of a slip stream through a gas inlet 59 of the sparger 72 of the evaporator 93.

The sparger 72 includes a set of radial conduits, such as the conduit 95 connected in fluid communication with the vertical conduit or manifold 59. Orifices such as the orifice 77 in the conduit 95 permit the hot waste gas to bubble through a pool of sludge in the evaporator 93 to promote gas and liquid contact. In this manner, the gas and sludge are separated with steam leaving the evaporator 93 through an outlet 73 disposed above the sludge level, from whence it passes to the wet scrubber system.

Dilute sludge from the wet scrubber system flows through a line 76 into the bottom of the evaporator 93 where it is mixed with the sludge in the evaporator 93. The sludge mixture exits thorough an outlet 81 via a conduit 82 to the inlet of a pump 85 to move the sludge to a tee 85A. A predetermined portion of the wet sludge is pumped via a conduit 89 through a filter 98 back into the evaporator 93 for recirculation. Another preselected portion flows via a conduit 86 into the solidifier.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A particle discharge system for processing a hot waste gas comprising:

a wet scrubber for separating particulate from a hot waste gas, said particulate being removed in the form of a sludge;

a treatment chamber;

means for diverting the hot waste gas having unwanted constituents into the treatment chamber;

drying means disposed within said chamber for drying said sludge to concentrate it;

said drying means including conduit means for supplying hot waste gas to mix with the sludge to evaporate liquid therefrom;

means for recirculating the concentrated sludge back into said chamber;

collector means for receiving the concentrated sludge from said chamber; and means for supplying a solidifying additive to the collected concentrated sludge.

2. A particle discharge system of claim 1, wherein said diverting means separates a waste gas stream into a component which is diverted into a wet scrubber and a component which is diverted into said treatment chamber.

3. A particle discharge system of claim 1, wherein said conveying means includes a plurality of sludge supply conduits.

4. A particle discharge system of claim 1, wherein said collector means includes a plurality of sludge mixing tanks.

5. A particle discharge system of claim 4, including means for alternating delivery of sludge to said mixing tanks.

6. A particle discharge system of claim 4, wherein each of said mixing tanks has mixing means disposed therein.

7. A particle discharge system of claim 1, wherein said solidifying additive is selected from the group consisting of lime, Portland cement and Sorbond ®.

8. A particle discharge system of claim 1, wherein said treatment chamber has means for atomizing the particulate.

9. A particle discharge system of claim 8, wherein said atomizing means is a Venturi cone.

10. A particle discharge system of claim 1, including quenching means for reducing waste gas temperature upstream of said means for atomizing the particulate.

11. A particle discharge system of claim 1, wherein said treatment chamber includes sparger means for bubbling waste gas through the sludge.

12. A particle discharge system of claim 1, including means for recirculating sludge within said chamber.

13. A particle discharge system of claim 12, wherein said recirculating means includes a filter.

14. A particle discharge system of claim 1, including means for recirculating sludge through said wet scrubber.

15. A particle discharge system of claim 14, including valve means for controlling recirculation of sludge through said wet scrubber.

16. A particle discharge system of claim 1, including means for isolating said treatment chamber from said wet scrubber to permit the wet scrubber to function independently of the treatment chamber.

17. A method of concentrating sludge from a wet scrubber comprising:
 diverting a part of an airstream having unwanted constituents into a treatment chamber;
 providing means within said chamber for evaporating at least a portion of said airstream to product a sludge;
 supplying hot waste gas to mix with the sludge to evaporate liquid therefrom;
 collecting the sludge;
 removing the sludge from said chamber;
 conveying the sludge to a collector;
 collecting the sludge in a collector;
 adding a solidfying agent to the collected sludge; and
 removing the sludge from the collector.

18. A method of claim 17, including mixing the sludge in the collector.

19. A method of claim 17, including removing sludge from the wet scrubber and delivering the sludge to the treatment chamber to quench the airstream therein.

* * * * *